Aug. 23, 1966        S. OLDBERG ETAL        3,267,697

UNIVERSAL JOINT

Filed Oct. 23, 1963        2 Sheets-Sheet 1

INVENTORS
SIDNEY OLDBERG
BY ROBERT E. STUEMKY

*Williams, David,*
*Hoffmann & Yount*
ATTORNEYS

Aug. 23, 1966  S. OLDBERG ET AL  3,267,697
UNIVERSAL JOINT

Filed Oct. 23, 1963  2 Sheets-Sheet 2

INVENTORS
SIDNEY OLDBERG
BY ROBERT E. STUEMKY
*Williams, David,
Hoffmann & Yount*
ATTORNEYS United States Patent Office 3,267,697
Patented August 23, 1966

1

3,267,697
UNIVERSAL JOINT
Sidney Oldberg, Birmingham, and Robert E. Stuemky, Royal Oak, Mich., assignors to Eaton Yale & Towne Inc., a corporation of Ohio
Filed Oct. 23, 1963, Ser. No. 318,268
13 Claims. (Cl. 64—15)

The present invention relates to a flexible coupling, and specifically to a constant velocity universal joint of the spring type operable to transmit uniform rotary movement between driving and driven members. Such constant velocity universal joints are operable to transmit torque in opposite directions between drive and driven members and are normally associated with the drive shaft of a vehicle.

Prior art constant velocity universal joints of the spring type do not have a sufficiently long life or torque transmitting capacity, and often fail due to fatigue. It has been discovered that this fatigue is due to the coils of the springs comprising the joint moving or creeping toward one end of the coupling thereby changing the pitch or helix angle between the coils and causing the coils of the spring units to assume a greater pitch at one end of the joint than at the other end of the joint. This causes fatigue in portions of the joint and creates failure. Moreover, the prior art joints having telescoped spring units are subject to drive line "clunk" or drive line noise during operation due to the constant radial contraction and expansion of the spring units comprising the joint causing radial separation of the spring units and subsequent engagement. The constant separation and engagement of the spring units causes a clunking noise which is highly undesirable.

Accordingly, a principal object of the present invention is the provision of a new and improved universal joint of the spring type which has a relatively high torque transmission capacity and a long life and is simple in construction, in expensive to manufacture, and quiet and reliable in operation.

Another object of the present invention is the provision of a new and improved constant velocity universal joint of the spring type constructed to prevent the individual coils of the springs comprising the joint from "creeping" toward one end of the joint or changing the pitch of the coils during operation whereby a highly improved universal joint having a relatively long life and high torque transmission capacity is provided.

A further object of the present invention is the provision of a new and improved universal joint of the spring type including anti-creep means for preventing the pitch of the individual coils of the springs to vary from one end of the joint to the other end and wherein the anti-creep means is provided by the particular shape of the spring members comprising the joint.

A further object of the present invention is the provision of a new and improved constant velocity universal joint including a plurality of coaxially extending nested or telescoped spring units which are in radial abutting engagement and have the shape of a truncated cone and wherein the shape of the spring units maintains the pitch of the coils of the spring units uniform from end to end thereby providing a joint having a relatively high capacity and long life.

A further object of the present invention is the provision of a new and improved universal joint comprising a plurality of coaxial and coextending nested spring units associated in a manner so that under driving conditions involving torque reversal as well as normal driving conditions the units remain in radial abutting engagement and thus minimize drive line "clunk" or noise caused by the spring units radially separating and then engaging.

2

A further object of the present invention is the provision of a new and improved universal joint having a plurality of concentric, coaxial, and coextensive nested or telescoped spring units wherein the spring units are torsionally preloaded in selected directions so that the spring units remain in radial engagement during normal operation of the joint.

A further object of the present invention is the provision of a new and improved universal joint comprising a plurality of nested or telescoped spring units in radial abutting relationship and wherein adjacent spring units are of different hand or pitch and wherein the spring units are preloaded so as to remain in radial abutting relationship during normal operation of the joint.

A further object of the present invention is the provision of a new and improved universal joint including a plurality of telescoped spring units of different pitch or hand for transmitting torque between driving and driven members and wherein the drive and driven members may move universally relative to each other and are associated by a ball and tube construction providing for relative pivotal movement of the shaft members as well as longitudinal movement of the shaft members relative to each other.

Further objects and advantages of the present invention will be apparent to those skilled in the art to which the present invention relates from the following detailed description of a preferred embodiment thereof made with respect to the accompanying drawings forming a part of this specification and in which.

Figure 1:
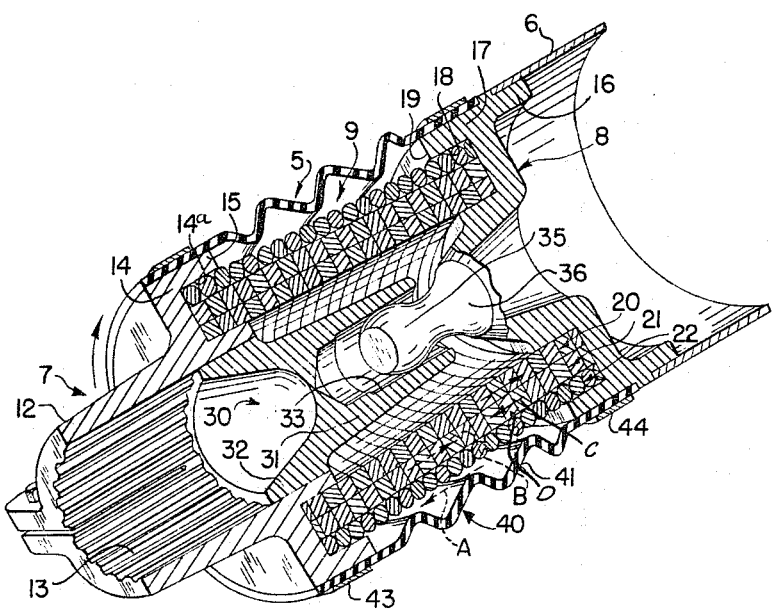
FIG. 1 is a sectional perspective view of a universal joint embodying the present invention.

The present invention relates to universal joints of the spring type used to transmit torque in opposite directions between driving and driven members. Primarily, such joints are used in vehicles and are associated with the drive shaft thereof. Often two universal joints are used at opposite ends of the drive shaft, namely at the front and rear ends thereof. As is well known, however, these joints may be used in any environment to allow for universal pivotal movement of the driving and driven members relative to each other as well as transmit torque therebetween.

Referring now specifically to the drawings, the preferred embodiment of the present invention comprises a universal joint 5 of the spring type for use in association with a drive shaft 6 of an automobile. The universal joint 5 illustrated in the drawings is a front end joint and transmits torque from the transmission of the automobile, not shown, to the drive shaft 6. The joint 5 comprises a driving means 7 operatively connected to the transmission to be driven thereby, a driven means 8 adapted to be connected to the drive shaft 6, and spring means 9 connected to the driving and driven means for transmitting torque therebetween in opposite directions.

The driving means 7 includes a hollow shaft portion 12 splined internally, as shown at 13, which splined portion cooperates with a driving member, not shown, driven from the transmission. The driving means 7 also includes a radially extending flange or end cap portion 14 formed integrally with the hollow shaft portion 12 and connected thereto at the end thereof remote from the transmission. The end cap portion 14 of the drive means 11 has an annular extending recess 14a therein concentric with the axis of the shaft portion 12 and intersecting the surface 15 of the end cap portion 14, which surface faces axially and toward the drive shaft 6.

The driven means 8 includes a shaft connecting portion 16 suitably fixedly connected to the drive shaft 6, and an end cap portion 17 having an annular extending recess 18 therein which is concentric with the axis of the drive shaft 6 and which intersects the surface 19 of the end cap portion 17, which surface faces axially toward surface 15 of the end cap portion 14 of the drive means 7. The recesses 14a and 18 have substantially the same radial extent and axial depth, however, the recess 18 is located radially inwardly of the recess 14a, for a purpose which will be apparent from the description hereinbelow.

The spring means 19 which transmits torque from the driving means 7 to the driven means 8 comprises a plurality of spring members or packs or units 20, 21 and 22. The spring members or units extend coaxially and are nested or telescoped together with the spring unit 20 being the inner unit, the spring unit 21 being the intermediate unit, and the spring unit 22 being the outer unit. The opposite ends of each of the spring units are suitably connected to the end cap portions 14 and 17 of the driving and driven members, respectively, so as to transmit torque therebetween. As viewed in FIG. 5, the left end portion of the spring units 20, 21 and 22 are positioned in the recess 14a while the right end portions of the spring units are positioned in the recess 18. These end portions of the spring units 20, 21 and 22 may be secured in the recesses 14a and 18, respectively, in any suitable manner and preferably are press fitted therein.

The universal joint 5 further preferably includes a ball and tube construction 30 which supports the driving and driven means for universal relative pivotal movement therebetween and also provides for longitudinal axial relative movement between the driving and driven means. The ball and tube construction 30 comprises an axially extending tubular member 31 connected by an annular portion 32 with the end cap portion 14 of the driving means 7. The tubular member 31 has an axially extending passageway 33 therein.

The ball and tube construction 30 further includes a suitable spherically-shaped ball member 35 connected to the end cap portion 17 of the driven means 8 by means of an axially extending portion 36. The ball member 35 is slidably received in the passageway 33 of the tubular member 31 and is movable axially therein and is pivotal in a universal manner therein. From the above description it can be seen that the driving means 7 and driven means 8 can pivot relatively in a universal manner and moreover can move relatively in an axial direction.

The universal joint 5 also includes a sleeve-like boot member 40 surrounding the spring units 20, 21, 22. The boot member 40 functions to hold a lubricant in a surrounding relation to the spring units 20, 21 and 22, and to the ball and tube construction 30. The boot member 40 is made of a suitable rubber-like yieldable material and has a bellows-like portion 41 intermediate its ends. The opposite ends of the sleeve member 40 are secured to the driving and driven means by suitable clamp members 43, 44, respectively. The bellows construction 41 facilitates expansion and contraction of the sleeve member 40 in an axial direction upon relative movement of the driving and driven means in an axial direction. Moreover the yieldable construction of the sleeve member 40 permits yielding thereof upon universal pivotal movement between the driving and driven members.

According to the present invention the spring units 20, 21 and 22 transmit torque between the end cap portions 14 and 17, and each of the spring units has a truncated conical shape for a purpose to be described and comprises a plurality of individual spiral spring members. The inner spring unit 20 is made up of five individual open wound left-hand spiral springs 50 to 54 having coils which are rectangular in cross-section. The springs 50 to 54 are wound so that the coils or helices thereof are spaced an axial distance equal to the axial cross-sectional dimension of the coils of the other springs. For example, the adjacent coils 50a and 50b of the spring 50 have an axial distance therebetween substantially equal to the sum of the axial dimensions of the cross section of one coil of the springs 51 to 54. The spring unit 20 is provided by assembling the springs 50 to 54 so that the coils thereof are interdigitated and in axial abutting relation, and therefore the spring unit 20 is in the form of a tapered cylinder member or truncated conical member.

The intermediate spring unit 21 is made up of five individual right hand open-wound spiral spring members 60 to 64 having coils rectangular in cross-section. The adjacent coils of the spring members 60 to 64 are spaced apart in an axial direction a distance substantially equal to the sum of the axial dimensions of the cross section of the coils of other springs in the unit. For example, coil 60a of spring 60 is spaced from coil 60b a distance equal to the sum of the axial dimensions of the cross-section of a coil of the other spring members, namely equal to the sum of the axial cross-sectional dimension of a coil of the springs 61 to 64. The spring unit 21 is provided by assembling the springs 60 to 64 such that the coils of the individual springs are interdigitated and in axial abutment, and therefore the spring unit 21 is in the form of a tapered cylinder member or truncated cone.

The outer spring unit 22 is made up of six individual open wound left-hand spiral coil springs 70 to 75 having coils of a uniform circular cross-section. The individual coils of the open wound springs 70 to 75 are spaced axially apart a distance substantially equal to the sum of the axial cross-sectional dimension of the other five spring members. For example, coil 71a spaced from coil 71b of the spring 71 a distance equal to the sum of the axial cross-sectional dimensions of a coil of the other spring units. The spring unit 22 is provided by assembling the spring members 70 to 75 in an interdigitated axially abutting relation and is in the form of a tapered cylinder member or of a truncated cone.

Figure 2:
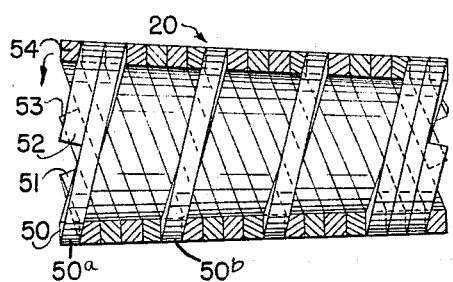
FIGS. 2, 3 and 4 are views partially in section and each illustrating a separate individual spring unit forming a portion of the universal joint shown in FIG. 1.

As stated hereinabove, the spring units 20, 21 and 22 are telescoped and extend coextensively and radially abut or engage the adjacent spring unit or units. The inner spring unit 20 is positioned in the passage through the intermediate spring unit 21. The inside diameter of the spring unit 21 is slightly less than the outside diameter of the spring unit 20. In the assembling of the spring unit 20 with the spring unit 21, as described above, the spring unit 20 is torsionally preloaded in the direction indicated by the arrow in FIG. 2. Torsionally preloading the spring unit 20 in the direction of the arrow in FIG. 2 causes the spring unit 20 to contract radially and gives the spring unit the tendency to expand. When contracted the spring unit 20 may be inserted into the spring unit 21. When the preloaded spring unit 20 is inserted in the spring unit 21 it will expand or unwind until it radially abuts the spring unit 21. However, it will not expand to its unloaded condition, and thus when assembled the spring unit 20 is torsionally loaded in a direction tending to cause it to expand.

Figure 3:
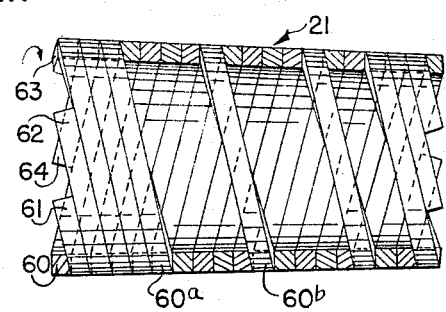

The spring unit 21 is also torsionally loaded when assembled with the other spring units. During assembly the spring unit 21 is torsionally preloaded in the direction of the arrow in FIG. 3 causing the spring unit 21 to expand radially thereby imparting to the spring unit 21 a tendency to contract radially. Thus the spring unit 21 is torsionally loaded when assembled and tends to contract radially. However, due to engagement with the spring unit 20 it does not return to its unloaded condition. Since the spring unit 21 is acting to contract radially and the spring unit 20 is acting to expand radially when they are assembled, it should be readily appreciated that these units have a radial pressure engagement.

Figure 4:
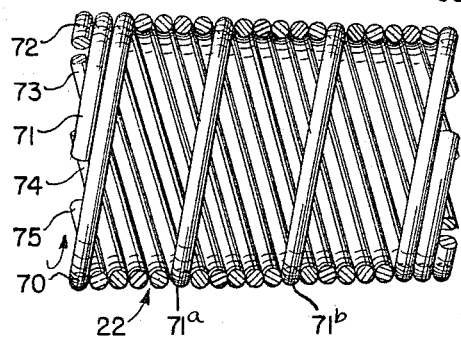

The spring unit 22 is also torsionally loaded when operatively associated with the spring units 20, 21. During assembly the spring unit 22 is torsionally preloaded in the direction of the arrow shown in FIG. 4 which causes the spring unit 22 to expand radially imparting a tendency to the spring unit to contract radially. When the spring unit 21 is positioned in the spring unit 22, complete contraction of spring unit 22 is prevented due to engagement with the spring unit 21 and the tendency of the spring unit 22 to contract establishes a radial pressure engagement between the units 21, 22.

From the above description it should be apparent that the spring units are torsionally loaded when assembled, with the spring unit 20 tending to expand and the spring units 21 and 22 tending to contract. As described above the spring units are in radial abutting pressure engagement with the adjacent spring units, and they remain in radial abutting engagement during normal operation to thereby eliminate drive line clunk and backlash or other noise during the transmission of torque due to radial separation and engagement of the spring units.

It can be readily appreciated that during the transmission of torque in the direction as indicated by the arrow in FIG. 1, indicating a clockwise direction of rotation, the spring units 20 and 22 would tend to contract radially since they are left hand wound spring units while the spring unit 21 would tend to expand radially since it is a right hand wound unit. Since spring unit 21 tends to expand and spring unit 22 tends to contract, these units are placed in tight radial abutting engagement to effect transmission of torque therebetween. Since the spring unit 20 is tending to expand due to its loaded condition, rotation in the direction of the arrow in FIG. 1, does not effect a radial separation of the spring unit 20 from the spring unit 21. Rotation of the spring unit 20 is indicated causes the spring to tend to contract but no contraction takes place for the clockwise rotation merely overcomes some of its preloaded condition tending to expand the spring unit 20.

Upon counterclockwise rotation opposite the direction of the arrow shown in FIG. 1, the spring units 20 and 22 are rotated in a direction causing them to tend to uncoil or expand, while the spring unit 21 tends to contract. This drives the spring units 20, 21 into tight radial abutting relation for effecting the transmission of torque. The spring unit 22 tends to expand due to the counterclockwise direction of rotation, however, it does not move out of radial engagement with the spring unit 21 because counterclockwise rotation of the spring unit 22 does nothing more than overcome some of the loaded condition of the spring unit 22 tending to cause it to contract. Thus, the spring units remain in radial engagement when transmitting torque in opposite directions, and thus drive noises due to radial separation and engagement of the spring units are eliminated.

Figure 7:
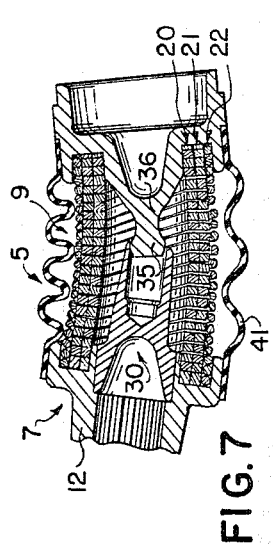
FIG. 7 is a longitudinal sectional view of the universal joint shown in FIG. 5 and illustrating the joint in an operating position.
Figure 6:
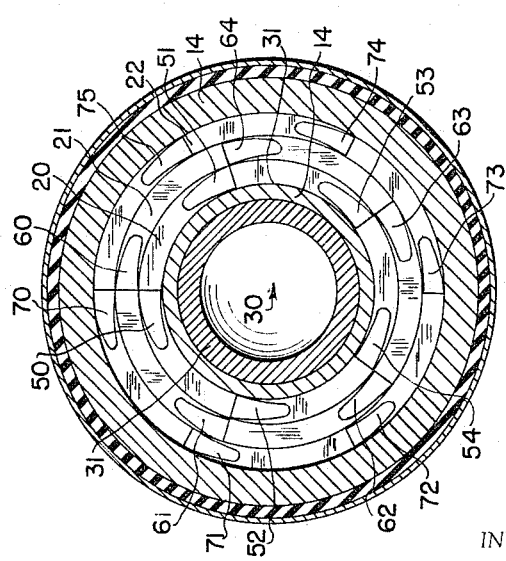
FIG. 6 is a transverse sectional view of the universal joint shown in FIG. 5 taken approximately along the section line 6—6 of FIG. 5.

As described above the spring units 20, 21 and 22 have a truncated conical shape. The truncated conical shape functions as an anticreep means for preventing coils of the spring units from creeping or moving along coils of the adjacent spring units toward one end or the other of the universal joint. The truncated conical shape prevents a change in the pitch angle between the coils of the springs from one end of the unit to the other and maintains a uniform pitch angle for all the coils of the spring units when transmitting torque. Any change in pitch of the coils of the spring units causes fatigue and uneven distribution of the forces in the joint resulting in distortion and subsequent failure of the joint. "Creep" is a great problem when the adjacent coils of the spring units are not in axial abutment and in joints where the coils of the spring units are spaced, and the tapered configuration functions to prevent creep in such a joint. Even when the coils are in axial abutment creep or a change in pitch angle can occur particularly when the coils are spaced when in an operating position as shown in FIG. 7.

By providing the truncated shape, the tendency of the coils to creep toward one end or another of the spring units is prevented due to the interference between the inner diameter of the outermost coils and the outer diameter of the innermost coils. More specifically, when transmitting torque and rotating in the direction of the arrow in FIG. 1 and primarily by spring units 21, 22 as described above, the coils of the spring unit 22 since they are left-hand wound tend to creep in the direction of the dotted arrow A, while coils of the spring unit 21 being right-hand wound tend to creep oppositely and as indicated by the dotted arrow B. Creep of the coils of the outermost spring unit 22 in the direction of the dotted arrow A shown in FIG. 1 relative to the coils of the intermediate spring unit 21 is prevented due to the tapered configuration of the spring units. The coils of the spring units 21 and 22 cannot move in the direction of the dotted arrows shown in FIG. 1 because the taper provides an interference fit between the coils of spring unit 21 and the adjacent coils of spring unit 22.

When transmitting torque and rotating in the direction opposite the direction indicated by the arrow in FIG. 1 and primarily by spring units 20, 21, the coils of spring units 20 and 21 tend to creep in the direction of the full line arrows C, D. However, the individual coils of the spring units 20 and 21 cannot creep in the direction of the arrows C, D shown in FIG. 1 due to an interference provided by the tapered construction by these spring units similar to the interference as described in connection with units 21 and 22. Thus, it can be seen that creep or a change in pitch angle between the coils of the spring units transmitting torque is prevented by the truncated configuration.

Figure 5:
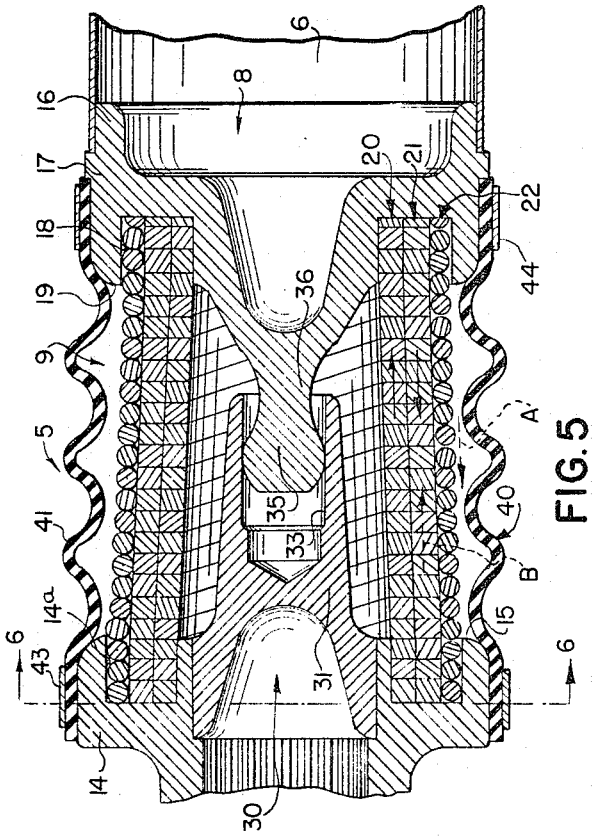
FIG. 5 is a longitudinal axial sectional view of the universal joint shown in FIG. 1.
Figure 8:
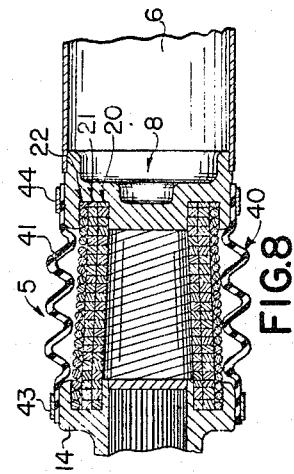
FIG. 8 is a longitudinal sectional view of a modified universal joint.

FIG. 8 shows a modified embodiment of the present invention wherein parallel axial misalignment is possible between the driving and driven members 7, 8, respectively, due to the elimination of the ball and tube construction shown in FIG. 5. The same reference characters used to designate parts of the joint shown in FIG. 1 are used to designate corresponding parts of the joint shown in FIG. 8. It should be apparent that the driving and driven means may be displaced radially relative to each other providing for parallel misalignment thereof as well as axial relative displacement therebetween. The driving and driven means 7, 8, respectively, in the modification shown in FIG. 8 are provided with central portions free of any extensions into the area between the coils of the spring unit 20 for connecting the driving and driven means.

It should be understood that the preferred embodiment of the present invention has been described herein in great detail, and that certain modifications and changes therein may be made by those skilled in the art to which it relates, and it is intended to cover hereby all changes, adaptations, and modifications falling within the scope of the appended claims.

Having thus described our invention, we claim:

1. A coupling member for transmitting torque between driving and driven members comprising spring means operatively connected to said driving and driven members to effect the transmission of torque therebetween; said spring means including inner, intermediate, and outer spring units in a telescoped relation and having their opposite ends connected to said driving and driven members to transmit torque therebetween; said inner spring unit being torsionally loaded in a direction causing said spring unit to tend to expand and said intermediate and outer spring units being torsionally loaded in a direction causing said inner and outer spring units to tend to contract; said inner and intermediate spring units and said intermediate and outer spring units having a radial pressure engagement therebetween which prevents expansion of said inner spring unit and contraction of said intermediate and outer spring units causing said spring units to remain in radial engagement during the transmission of torque whereby drive noises due to radial separation and return of the spring units into engagement are eliminated.

2. A coupling member as defined in claim 1 wherein the cross section of the coils of the inner and intermediate spring units is substantially rectangular and wherein the cross section of the coils of the outer spring unit is circular.

3. A coupling member for transmitting torque between driving and driven means comprising spring means operatively connected to said driving and driven means to effect the transmission of torque therebetween, said spring means including first and second spiral spring units in a nested or telescoped relation and having their opposite ends connected to said driven and driving members to transmit torque therebetween, and said first and second spring units having a truncated conical shape to prevent variance in the pitch angle between the coils of the spring units during operation.

4. A coupling member for transmitting torque between driving and driven means comprising spring means operatively connected to said driving and driven means to effect the transmission of torque therebetween; said spring means including first and second spiral spring members in a telescoped relation and having their opposite ends connected to said driving and driven means to transmit torque therebetween; said first and second spring members being in radial abutting relation and having a truncated conical shape to prevent variance in the pitch angle between the coils of the spring units during the operation.

5. A coupling member for transmitting torque between driving and driven means comprising spring means operatively connected to said driving and driven means to effect the transmission of torque therebetween; said spring means including inner, intermediate, and outer spring units in a nested or telescoped relation and having their opposite ends connected to said driving and driven means to transmit torque therebetween; said inner spring unit being torsionally loaded in a direction causing said inner spring unit to tend to expand and said intermediate and outer spring units being torsionally loaded in a direction causing said intermediate and outer spring units to tend to contract; said inner and intermediate spring units and said intermediate and outer spring units, respectively, having a radial pressure engagement therebetween which prevents expansion of said inner spring unit and contraction of said outer and intermediate spring units, and said inner, intermediate and outer spring units having a truncated conical shape to prevent variance in the pitch angle between the coils of the spring units during transmission of torque.

6. A coupling member as defined in claim 5 wherein said driving and driven means include end cap portions having an annular recess therein in which the opposite ends of said spring units are secured, the annular recess in the end cap portion of the driven means being spaced radially inwardly of the annular recess in the end cap portion of the drive means.

7. A coupling member as defined in claim 5 wherein one of said driving and driven means has a tube member connected thereto and the other of said driving and driven means has a ball member connected thereto and positioned in said tube member and movable axially therein and pivotal universally relative thereto.

8. A coupling member for transmitting torque between driving and driven members comprising spring means operatively connected to said driving and driven members to effect the transmission of torque therebetween; said spring means including inner, intermediate, and outer spring units in a telescoped relation and having their opposite ends connected to said driving and driven members to transmit torque therebetween; said inner spring unit being torsionally loaded in a direction causing said inner spring unit to tend to expand and said intermediate and outer spring units being torsionally loaded in a direction causing said intermediate and outer spring units to tend to contract, said inner and intermediate spring units and said intermediate and outer spring units having a radial pressure engagement therebetween which prevents expansion of said inner spring unit and contraction of said intermediate and outer spring units causing said spring units to remain in radial engagement during the transmission of torque whereby drive noises due to radial separation and return of the spring units into engagement are eliminated, said spring units having a truncated conical shape which prevents variance in the pitch angle between the coils of the individual spring units during operation and which converse as the units extend away from the driving member.

9. A coupling member for transmitting torque between driving and driven members comprising spring means operatively connected to said driving and driven members to effect the transmission of torque therebetween; said spring means including inner, intermediate, and outer spring units in a telescoped relation and having their opposite ends connected to said driving and driven members to transmit torque therebetween; said inner spring unit being torsionally loaded in a direction causing said inner spring unit to tend to expand and said intermediate and outer spring units being torsionally loaded in a direction causing said intermediate and outer spring units to tend to contract; said inner and intermediate spring units and said intermediate and outer spring units having a radial pressure engagement therebetween which prevents expansion of said inner spring unit and contraction of said intermediate and outer spring units causing said spring units to remain in radial engagement during the transmission of torque whereby drive noises due to radial separation and return of the spring units into engagement are eliminated, each spring unit comprising a plurality of open wound spiral springs with the coils of the springs interdigitated and axially abutting to provide a complete cylindrical spring unit having the shape of a truncated cone.

10. A coupling member for transmitting torque between driving and driven means comprising spring means operatively connected to said driving and driven means to effect the transmission of torque therebetween, said spring means including first and second coil spring units, said first coil spring unit being of one hand and said second coil spring unit being of a hand opposite that of the first coil spring unit, said first coil spring unit having an outer diameter dimensioned greater than the corresponding dimensions of the inner diameter of the second coil spring unit, said first and second coil spring units being in a telescoped relation with the first coil spring unit positioned interiorly of the second coil spring unit and said coil spring units having a radial pressure engagement therebetween, and the opposite ends of said first and second coil spring units connected to said driving and driven means to transmit torque therebetween.

11. A coupling member as defined in claim 10 wherein said coil spring units have a truncated conical shape and converge as the units extend away from the driving means.

12. A coupling member as defined in claim 10 wherein the cross section of the coils of the second spring unit is substantially circular and the cross section of the coils of the first spring unit is substantially rectangular.

13. A coupling member as defined in claim 10 wherein said driving means includes a driving end cap portion and said driven means includes a driven end cap portion and including a tubular member connected to one of said end cap portions and extending into the passage through the coils of the first spring unit and a ball member connected to the other of said end cap portions and positioned in said tubular member and movable axially therein and pivotal universally relative thereto.

References Cited by the Examiner

UNITED STATES PATENTS

| | | |
|---|---|---|
| 779,374 | 1/1905 | Phillips. |
| 1,312,296 | 8/1919 | Apple. |
| 1,337,646 | 4/1920 | Eckart. |
| 1,429,146 | 9/1922 | Karge. |
| 1,489,439 | 4/1924 | Karge. |
| 1,507,920 | 9/1924 | Karge et al. |
| 3,000,197 | 9/1961 | Ruegg et al. |

FRED C. MATTERN, Jr., *Primary Examiner.*

BROUGHTON G. DURHAM, *Examiner.*

H. C. COE, *Assistant Examiner.*